United States Patent [19]

Messerschmitt

[11] 4,308,505
[45] Dec. 29, 1981

[54] FREQUENCY DETECTOR DEVICE AND METHOD

[75] Inventor: David G. Messerschmitt, Walnut Creek, Calif.

[73] Assignee: TRW, Inc., Los Angeles, Calif.

[21] Appl. No.: 48,027

[22] Filed: Jun. 13, 1979

[51] Int. Cl.³ .............................................. H03L 7/00
[52] U.S. Cl. ..................................... 331/25; 331/1 R
[58] Field of Search ................. 331/18, 20, 25, 1 A, 331/1 R; 307/233 R; 455/260

[56] References Cited

U.S. PATENT DOCUMENTS 3,840,821 10/1974 Conway ................................. 331/25
4,100,503 7/1978 Lindsey et al. ...................... 331/1 A

OTHER PUBLICATIONS

Axelsson, E., "Analysis of the Quantizing Error of a Zero-Counting Frequency Estimator", *IEEE Trans. Information Thy.*, vol. IT–22, p. 596, 9/76.
Park, Jr., G., "An FM Detector for Low S/N", *IEEE Trans. Comm.*, vol. Com–18, p. 110, Apr. 1970.
Runge, J., "Phase Locked Loops with Signal Injection for Increased Pull-In Range and Reduced Output Phase Jitter", IEEE Trans. Comm., vol. 4, 6/76.
Penwarden et al., "Improving Digital Radio Efficiency", Telephony, pp. 42-47, Jun. 6, 1977.
Richman, D., "Color-Carrier Reference Phase Synchronization Accuracy in NTSC Color Television", Proc. Ire., vol. 42, p. 106, 1/54.
Pickard, T., "The Effects of Noise on a Method of Frequency Measurement", Ire Trans. Information Thy., vol. IT–4, p. 83, 6/58.
Pawula, Robert, "Analysis of an Estimator of the Center Frequency of a Power Spectrum", IEEE Trans. Information Thy., vol. IT–14, p. 669, 9/68.
Cahn, C., "Improving Freq. Aquisition of a Costas Loop", IEEE Trans. on Comm., vol. Com–25, p. 1453, 12/77.
Oberst, J. F., "Generalized Phase Comparators for Improved PLL Aquisition", IEEE Trans. on Comm. Tech., vol. Com–19, p. 1142, 12/71.
Duttweiler, D., "The Jitter Performance of Phase Locked Loops", The Bell System Technical Journal, pp. 37–58, 1/76.

*Primary Examiner*—David K. Moore
*Attorney, Agent, or Firm*—Flehr, Hohbach, Test et al.

[57] ABSTRACT

A frequency detector and method for use in timing and carrier recovery applications. In a timing recovery application, the circuit includes means for generating a variable frequency periodic clock signal corresponding to an input data signal, means for determining whether successive data transitions of the data signal occur during first and second predetermined portions of successive cycles of the clock signal and means for changing the frequency of the clock signal when successive data transitions occur during different ones of the predetermined portions. For carrier recovery applications, the circuit includes means responsive to an input signal for generating a timing recovery signal, means for generating a local carrier signal having in-phase and quadrature axis components, means responsive to the local carrier signal and to the input signal for forming a baseband signal having in-phase and quadrature axis components, means responsive to the timing recovery signal for sampling the baseband signal at timing intervals corresponding to the timing recovery signal thereby forming a sample baseband signal, means for determining when the sample baseband signal occurs within a predetermined region of the in-phase axis or quadrature axis and means for changing the frequency of the carrier signal if successive samples are on opposite sides of the in-phase axis or quadrature axis.

5 Claims, 18 Drawing Figures

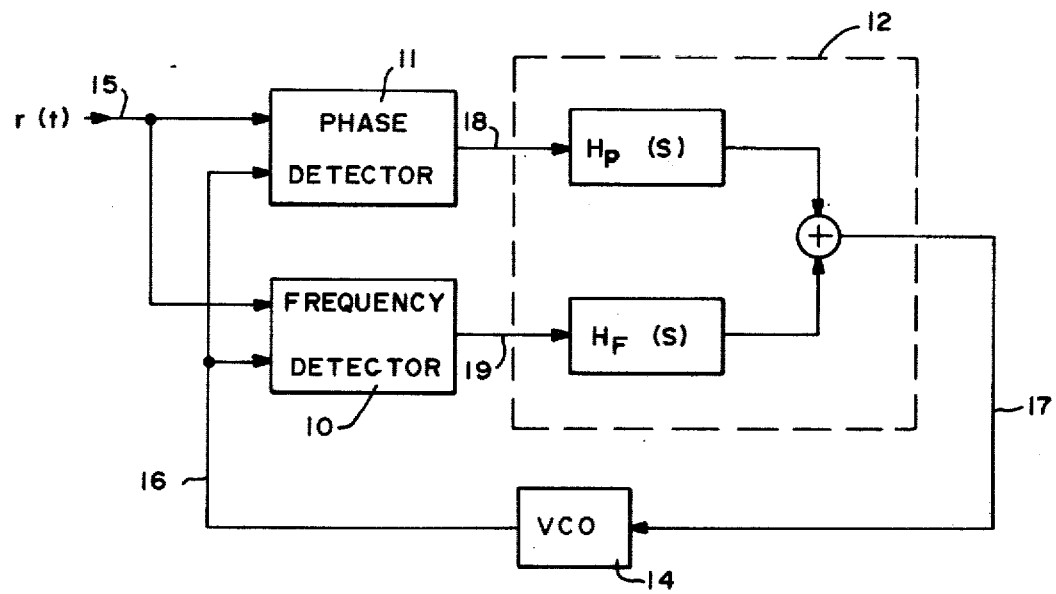
FIG.—1
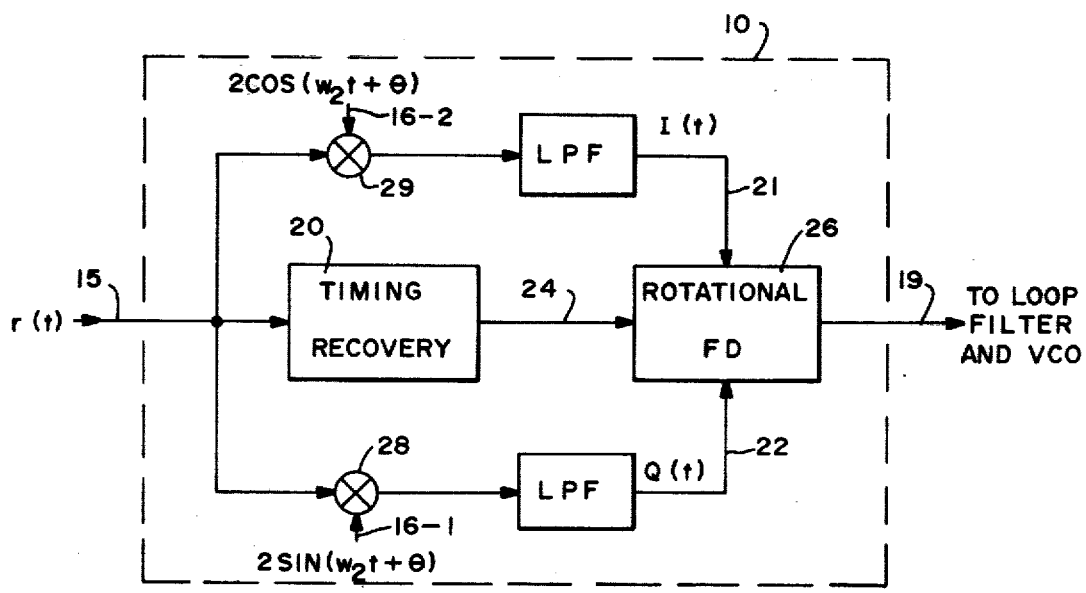
FIG.—2

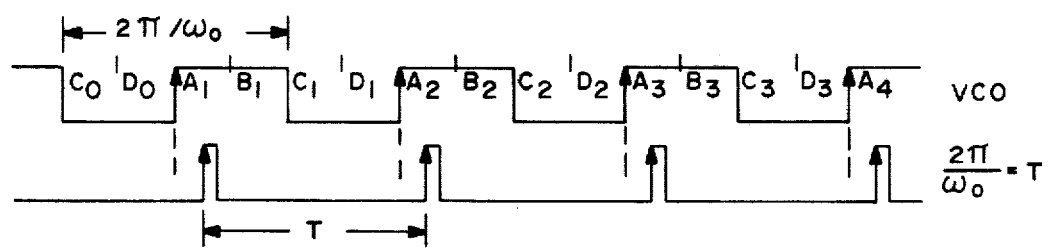
FIG.—3A
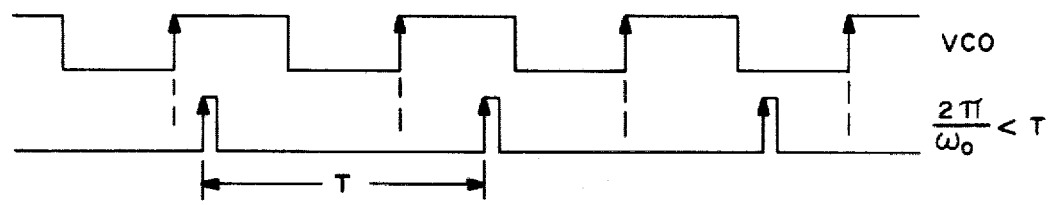
FIG.—3B
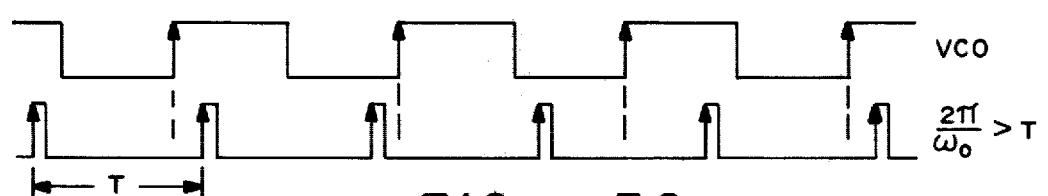
FIG.—3C
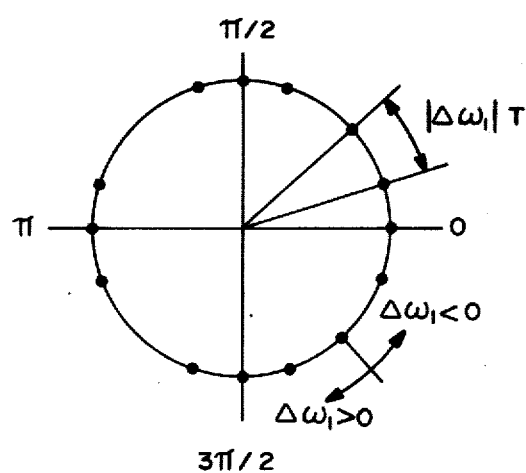
FIG.—4
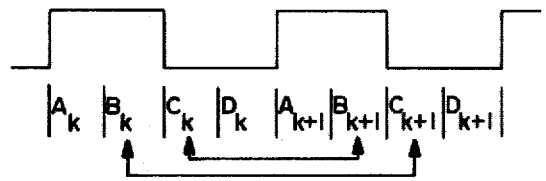
FIG.—5A
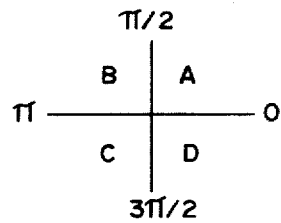
FIG.—5B
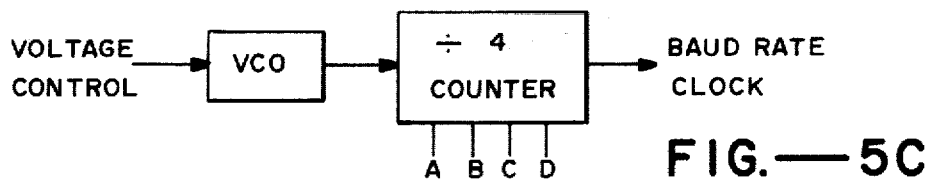
FIG.—5C

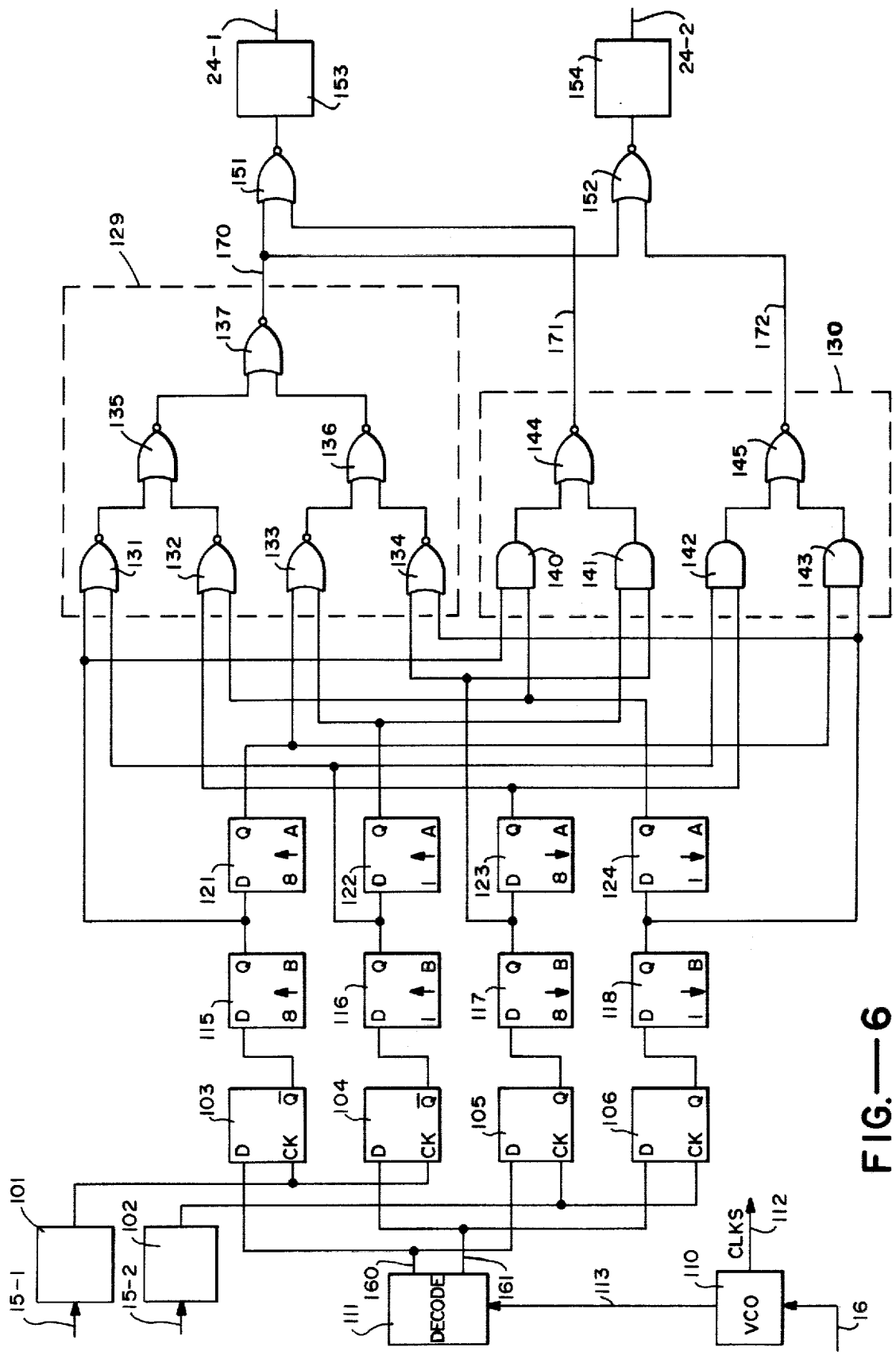
FIG.—6

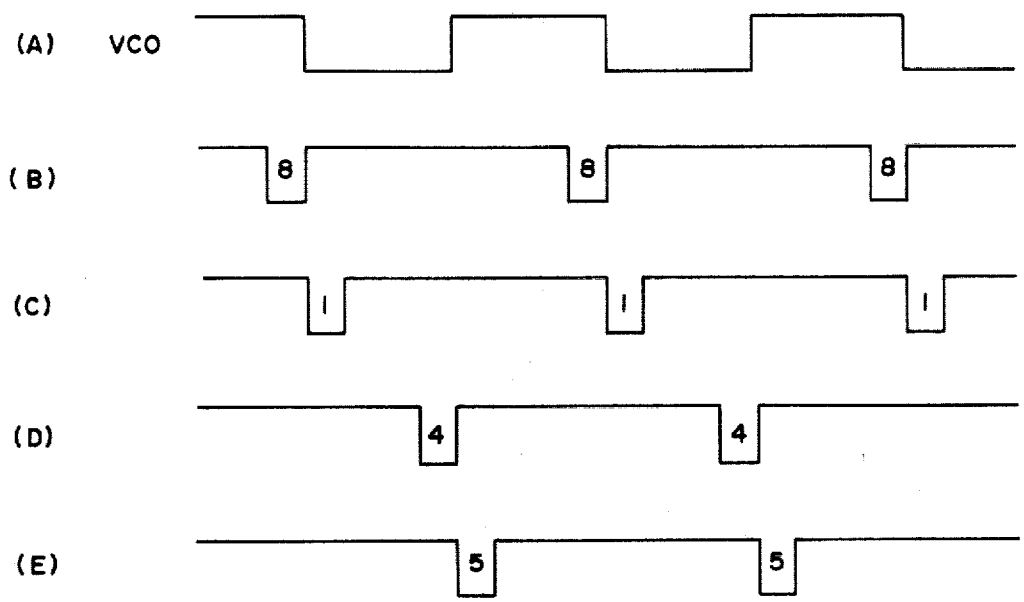
FIG.—7
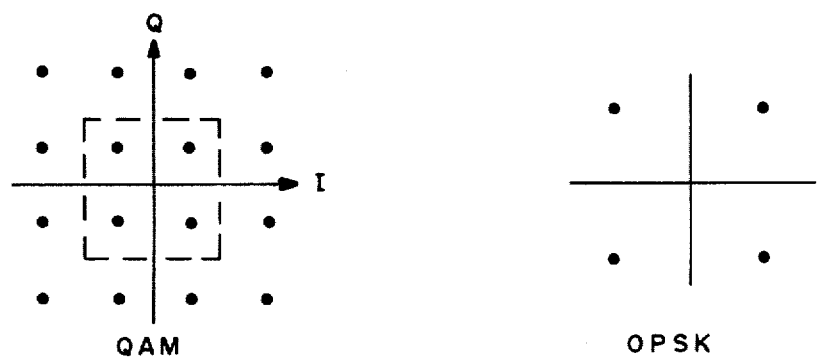
FIG.—8A  FIG.—8B

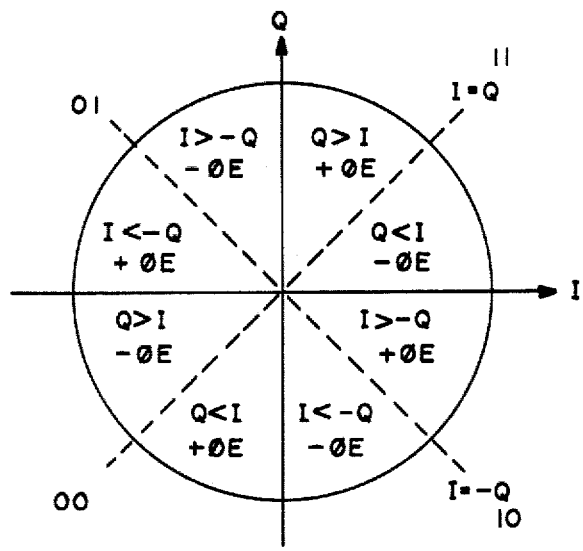
FIG.—9
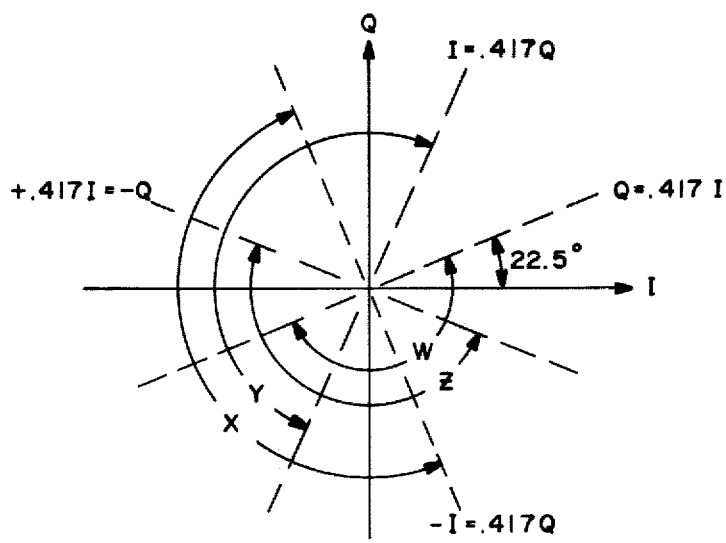
FIG.—11
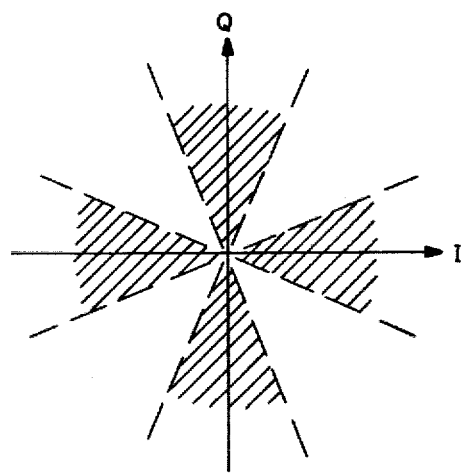
FIG.—12

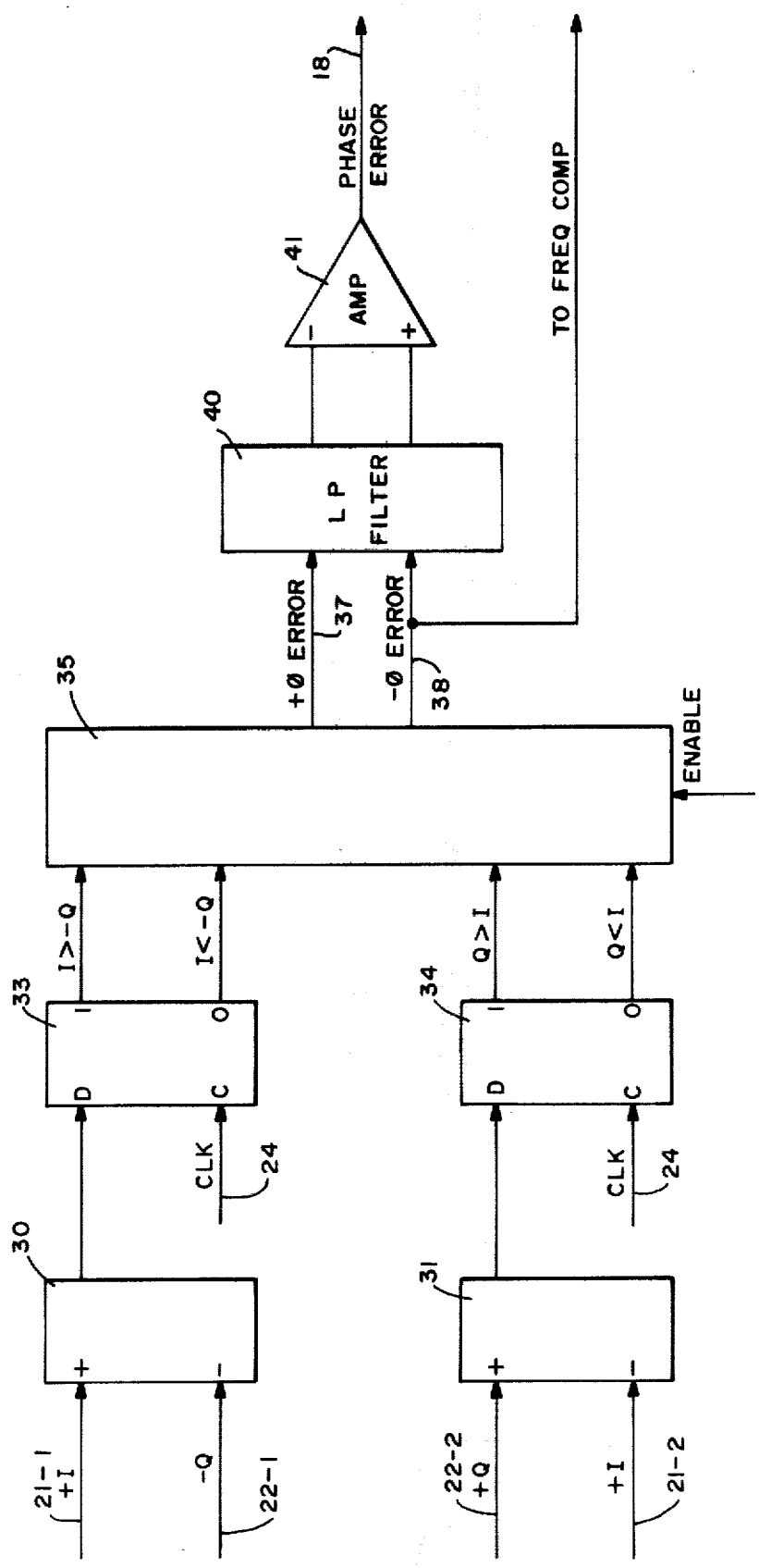
FIG—10

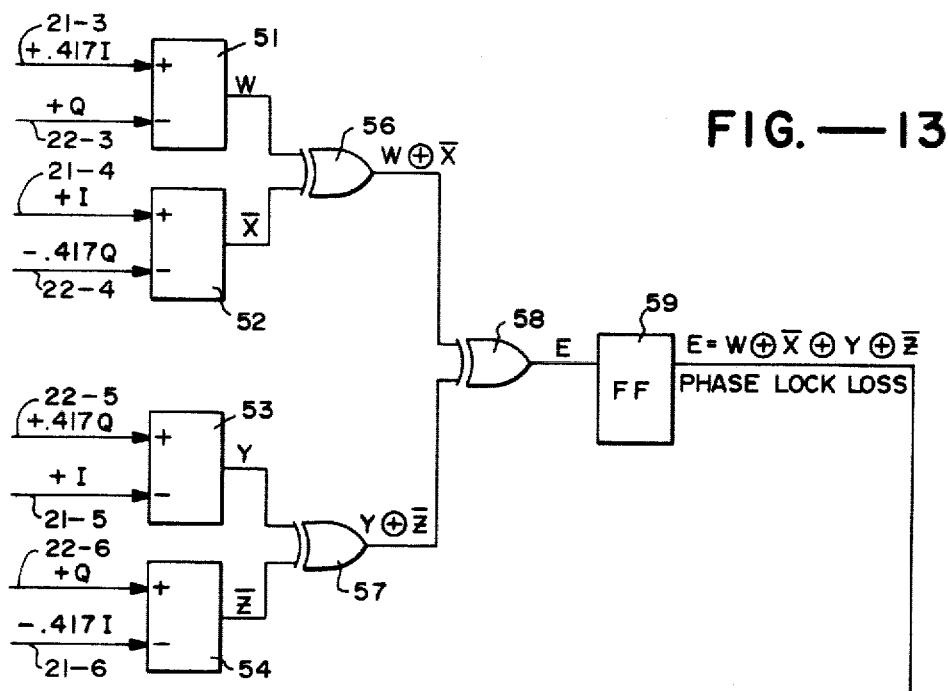
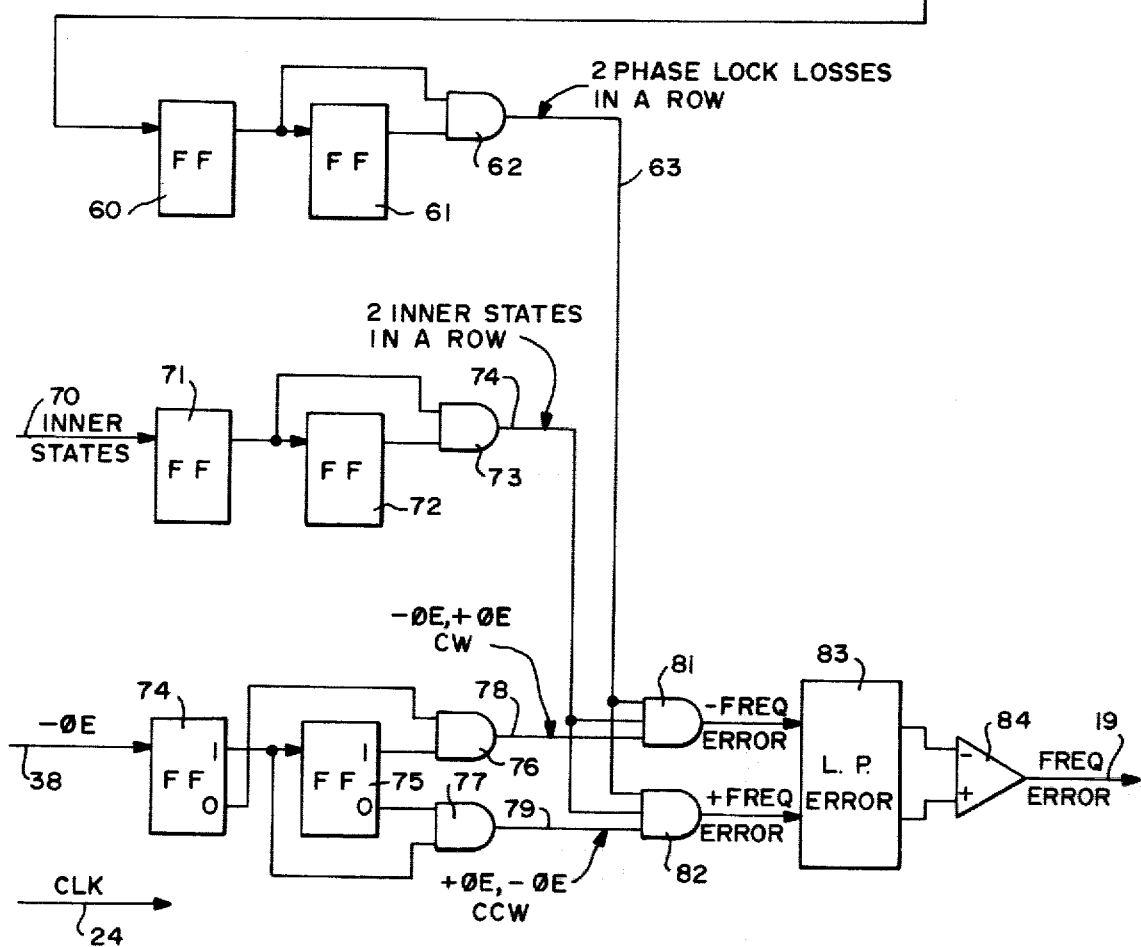
FIG.—13

FREQUENCY DETECTOR DEVICE AND METHOD

The present invention relates to a frequency detector device and method for use in phase lock loop acquisition in timing and carrier recovery.

A phase lock loop is an electronic circuit for locking a signal from a voltage controlled oscillator (VCO) in phase and frequency with an arbitrary input signal. A phase lock loop (PLL) is used in fundamentally two different ways. In one way, a PLL is used as a demodulator, where it is employed to follow and demodulate frequency or phase modulation. In a second way, a PLL is used to track a carrier or synchronizing signal which may vary in frequency with time.

When operating as a demodulator, the PLL may be thought of as a matched filter operating as a coherent detector. When used to track a carrier, it may be thought of as a narrow band filter for removing noise from the signal and regenerating a clean replica of the signal.

Two qualities of a phase lock loop specify performance. One is the hold-in range while the other is the pull-in range. The hold-in range is the maximum change in input frequency for which the loop will remain locked and is governed by the DC gain of the loop. As the input frequency is changed, the change in phase of the two signals to the phase detector will produce a DC control voltage that will change the frequency of the VCO. As the input frequencies change, the phase angle will continue to increase until the loop unlocks. The pull-in range is that range of frequencies that the loop will lock to if it is initially unlocked. If the loop is unlocked and the VCO is running at a frequency $f_1$ and an input frequency $f_2$ is applied, a beat note $f_1-f_2$ will appear at the output of the phase detector. This beat note contains many harmonics. In particular, if $f_1$ and $f_2$ are close enough, it will contain a DC component which will cause the VCO frequency to move in a direction so as to reduce the frequency difference. In this fashion the frequency difference will eventually be reduced to zero, resulting in lock.

A significant problem in PLL timing and carrier extraction is initial acquisition. Very narrow loop bandwidths are generally required to control phase jitter, and acquisition may depend upon an extremely accurate initial voltage controlled crystal oscillator frequency (VCXO) or sweeping. The narrow loop bandwidth generally required for jitter requirements severely restricts the pull-in range.

Prior art methods employed to achieve acquisition include compromises in loop filter design, highly accurate VCXO, sweeping of the VCO, and in-lock detection with switching of the loop filter. Another method of effective acquisition is to add a frequency detector (FD) to the traditional PLL phase detector (PD). With a large initial VCO frequency offset, the PD output has essentially a zero DC output, and the FD generates a voltage proportional to the frequency difference between input and VCO thereby driving that difference to zero. The PD takes over when the frequency difference is small, completing the acquisition. When the PLL is in-lock, the FD output will at least have zero mean, and desirably will be identically zero, automatically allowing the PD and its loop filter to govern the loop dynamics.

With this approach, a crystal controlled VCXO can often be exchanged for some FD circuitry in timing recovery applications. In carrier recovery, a VCXO is often still required because of the problem of false locking to a data sideband, but the sometimes troublesome in-lock detector and/or sweeping circuitry can be eliminated and the PD loop filter can be designed virtually independently of acquisition considerations, removing a significant burden from the designer.

In view of the above background, it is an object of the present invention to provide an improved frequency detector and method for use in phase lock loop acquisition in timing and carrier recovery.

By way of summary, the present invention relates to a frequency detector and method for use in timing and carrier recovery applications.

In accordance with one embodiment of the present invention, the circuit includes means for generating a variable frequency periodic clock signal corresponding to an input data signal and means for determining whether successive data transitions of the input data signal occur during first and second predetermined portions of successive cycles of the clock signal. The circuit also includes means for changing the frequency of the clock signal when successive data transitions occur during different ones of the predetermined portions.

In accordance with another embodiment of the present invention, the circuit includes means for generating a timing recovery signal and means responsive to the timing recovery signal for sampling an input baseband signal having in-phase axis and quadrature axis components at timing intervals, means for generating a variable inphase and quadrature carrier signal corresponding to the timing recovery signal thereby forming a sampled baseband signal. The circuit also includes means for determining when the sampled baseband signal occurs within a predetermined region of the in-phase or quadrature axis, and further includes means for changing the frequency of the carrier signal if successive samples of the sampled signal lie on opposite sides of the in-phase or quadrature axis.

In accordance with the above summary, the present invention achieves the objective of providing an improved frequency detector device and method for timing recovery and carrier recovery applications in a phase lock loop circuit.

Other objects and features of the present invention will become apparent from the following description when taken in conjunction with the accompanying drawings.

Referring to the drawings,

FIG. 1 depicts a block diagram of a phase lock loop circuit.

FIG. 2 depicts a block diagram of a frequency detector, which forms a portion of FIG. 1.

FIGS. 3A—3C depicts a timing diagram illustrating three cases to be distinguished by the frequency detector circuit of FIG. 1.

FIG. 4 depicts a plot of the phase of data transition pulses relative to the frequency of the voltage control oscillator circuit of FIG. 1.

FIGS. 5A–5C depicts a method of dividing the voltage control oscillator cycle into quadrants.

FIG. 6 depicts a timing recovery circuit according to the present invention.

FIG. 7 depicts a timing diagram illustrating timing for the circuit of FIG. 6.

FIGS. 8A and 8B depict signal constellations for QAM and QPSK signals, respectively.

FIG. 9 depicts a vector diagram showing the phase relationships for quadrature baseband signals.

FIG. 10 depicts a phase comparator which forms a portion of FIG. 1.

FIG. 11 depicts range patterns by the frequency detector of FIG. 2.

FIG. 12 depicts the operating ranges of the frequency detector of FIG. 1.

FIG. 13 depicts a frequency comparator according to the present invention which forms a portion of FIG. 2.

Referring now to FIG. 1, there is depicted therein a block diagram of a phase lock loop circuit including phase detector 11, frequency detector 10, loop filter 12, and voltage controlled oscillator (VCO) 14. Phase detector 11 and frequency detector 10 are connected to receive an input signal r(t) on bus 15 and a control signal on bus 16. VCO 14 provides a variable frequency signal on bus 16 to phase detector 11 and frequency detector 10 in response to a control signal on bus 17. The details of loop filter 12 and VCO 14 are known in the art and need not be described in detail.

Phase detector 11 is designed to operate within a predetermined range in order to provide proper locking to the input signal on bus 15, and generates appropriate control signals on bus 18 which, when filtered by typical filter 12, instructs the VCO 14 via bus 17 to increase or decrease the frequency on bus 16. When the predetermined range is exceeded, phase detector 11 cannot respond fast enough to changes or variations of the input signal on bus 15 and frequency detector 10 takes over when the predetermined range has been exceeded. Frequency detector 10 instructs VCO 14 via buses 17, 19 and filter 12 to increase or decrease the frequency of the signal on bus 16 thereby compensating for any changes of the input signal on bus 15 which exceed the range of phase detector 11.

There is motivation for using a frequency detector to aid acquisition in carrier recovery. Acquisition remains a problem since worst case initial frequency offsets can exceed the desired loop bandwidth by many orders of magnitude. The problem is particularly acute in microwave radio transmission, for even very accurate RF oscillator frequencies can result in absolute frequency offsets of 15 to 100 KHz, while carrier recovery loop bandwidths are more typically in the range of 0.1 to 1.0 KHz.

Referring now to FIG. 2, there is depicted therein a block diagram of frequency detector 10 of FIG. 1 which includes timing recovery circuit 20 connected to receive the input signal r(t) on bus 15 and which generates a timing recovery signal on bus 24. The signal on bus 15 used by the frequency detector to extract carrier frequency offset is assumed to be in the form of:

$$r(t) = x_c(t) \cos(\omega_1 t) - x_s(t) \sin(\omega_1 t)$$

where $\omega_1$ would typically be the carrier frequency at IF.

The first step for frequency detector 10 is to demodulate the r(t) input signal to baseband with quadrature carriers $2\cos(\omega_2 t + \theta)$ and $2\sin(\omega_2 t + \theta)$ in demodulators 29, 28 and after sampling the input signal by a timing recovery technique, the resulting quadrature baseband signals I(t) and Q(t) on buses 21, 22 are given in the form of:

$$I(kT) = x_c(kT) \cos(k\Delta\omega T - \theta) - x_s(kT) \sin(k\Delta\omega T - \theta) \quad [1]$$

$$Q(kT) = -x_c(kT) \sin(k\Delta\omega T - \theta) - x_s(kT) \cos(k\Delta\omega T - \theta) \quad [2]$$

where $\Delta\omega = \omega_1 - \omega_2$, $\omega_1$ corresponds to the suppressed carrier frequency, $\omega_2$ corresponds to the quadrature demodulation frequency and T = reciprocal of band frequency as derived by timing recovery circuit 20. Signals [1] and [2] above are generated through quadrature amplitude demodulation techniques well known in the art and are connected to rotational FD circuit 26. FD circuit 26 is also connected to receive the timing recovery signal on bus 24 from recovery circuit 20, as will be described.

The VCO signal referred to in FIG. 2 on buses 16-1, 16-2 (which corresponds to bus 16 of FIG. 1) is the locally generated carrier, $\cos(\omega_2 t + \theta)$ and $\sin(\omega_2 t + \theta)$. The object of the carrier recovery circuit 26 is to reduce $\Delta\omega$ to zero, and FD 10 aids acquisition as explained in conjunction with FIG. 2.

Within timing recovery circuit 20 is a phase locked loop timing recovery circuit similar to FIG. 1, the purpose of which is to generate a cyclic or periodic clock signal on lead 24 synchronous with the received data rate on lead 15 (the data transmission is inherent in the signals $x_c(t)$ and $x_s(t)$), and has period T seconds as in Equations [1-2]. Internal to circuit 20 is a frequency detector in accordance with the invention, in addition to the FD 26. The operation of the frequency detector, which forms a portion of timing recovery circuit 20, will be described first.

As is known in the art, timing recovery by a phase locked loop includes a circuit which extracts from lead 15 the locations of data transitions and generates a pulse for each such transition. These pulses do not occur every T seconds because two identical data symbols in a row will not generate a data transition pulse.

Three cases to be distinguished for timing recovery applications by the timing recovery circuit 20 of FIG. 2 are shown in FIG. 3 in which the VCO waveform is assumed to be a square wave with a radian frequency $\omega_0$ (period $T = 2\pi/\omega_0$). Further, for simplicity, it is assumed that a data transition occurs every T seconds and that all data transitions are positive, as represented by the narrow pulses in FIGS. 3A-3C. In FIG. 3A, the in-lock condition is recognized by the presence of positive transition pulses of the data signal in the vicinity of the positive transition of the VCO signal. In FIG. 3B, when the VCO frequency is too high ($2\pi/\omega_0 < T$), the positive transitions of the data signal move slowly to the right relative to the VCO positive transitions and conversely move to the left, as in FIG. 3C, when the VCO frequency is too low ($2\pi/\omega_0 > T$).

FIG. 4 depicts a plot of phase of data transition pulses relative to one cycle of the VCO. The concern is with the position of the transition pulses within the cycle of the VCO and therefore by dividing the VCO cycle into $2\pi$ radians, the relative phase for successive transition pulses can be plotted in FIG. 4. These points rotate around a circle, clockwise for $\Delta\omega_1 < 0$, counterclockwise for $\Delta\omega_1 > 0$, where $\Delta\omega_1 = \omega_0 - 2\pi/T$.

When two positive data transitions occur in a row as in FIG. 3A, the angle of rotation can be shown to be $|\omega_0 T - 2\pi|$ plus some jitter due to noise and intersymbol interference. When intermediate transitions are absent, rotations are by some multiple of $|\omega_0 - (2\pi/T)|T$.

From FIGS. 3 and 4 it is evident that in the absence of detailed knowledge of the data statistics, there are fundamental limitations to the range of any frequency detector. For example, if the VCO frequency were exactly double what it should be, transition pulses would always occur at the same VCO phase and it would appear that lock has been achieved. More generally, no frequency detector can distinguish between VCO frequencies $\omega_0$ and $\omega_0+2\pi/T$, one of which rotates by $2\pi$ radians more than the other, as in FIG. 4. Hence the maximum range for a frequency detector would be $|\Delta\omega_1|\leq\pi/T$ which corresponds to a 50% offset in the VCO frequency.

A phase detector is designed so that, when in-lock, the phase lock loop will maintain the positive transitions of the data, such as depicted in FIG. 3A, near positive transitions of the VCO. Therefore, when in-lock, positive transitions of the data are expected to be observed predominantly or exclusively in a predetermined range around the positive transitions, as depicted in FIG. 5B by quadrants A and D. The timing waveform in FIG. 5A could be divided into quadrants by using a divide by 4 counter, as illustrated in FIG. 5C, where the VCO actually runs at four times the rate of the timing waveform.

To insure that the frequency detector (FD) will produce an output rarely, if ever, in-lock, it is desired that it be operating only upon observation of positive transitions of $f_1$ in quadrants B and C. Upon detection of positive transitions in quadrants B and C, the FD will be enabled and will generate a frequency error signal for connection to the VCO.

In particular, the case in FIG. 3B where the VCO frequency is too high can be recognized by observation of a data transition in quadrant B of one VCO cycle followed by quadrant C of the next VCO cycle. The case of the VCO frequency too low as in FIG. 3C can be recognized by a data transition in quadrant C in one VCO cycle followed by quadrant B in the next VCO cycle.

In actuality, successive data transitions do not always occur, and when they do, they don't always occur in quadrants B and C. Thus, the occurrence described above only happens with some probability, which nevertheless is high enough to be able to reliably detect whether the VCO frequency is too high or too low.

Referring now to FIG. 6, the FD portion of the timing recovery circuit 20 according to the present invention is described in conjunction with FIG. 7.

In FIG. 6, VCO circuit 110 generates on bus 113 the VCO variable frequency periodic clock signal depicted in FIG. 7A. Circuit 110 could include logic circuitry (not shown) to divide each clock cycle into, for example, eight or four equal parts, which are then used as "windows" for the frequency detector to look through, as depicted in FIGS. 7B-7E.

For timing recovery applications, timing recovery circuit 20 must be capable of locking the VCO 110 output signal to an input data signal on buses 15-1, 15-2. Desirably, a phase detector (not shown) positions data transitions in lock at the positive edge of the VCO clock in FIGS. 7D and 7E, between regions 4 and 5.

Data transitions can be either negative or positive, and in FIG. 6 it is assumed that two separate detectors (not shown) identify positive transitions (bus 15-1) and negative transitions (bus 15-2). Two monostable multivibrators 101 and 102 generate short pulses of known duration in response to these two transition detections on buses 15-1, 15-2.

Referring again to FIG. 6, the output of multivibrator 101 is a clock to flipflops 103, 104, indicating when a positive transition is occurring. Similarly, the output of multivibrator 102 is a clock to flipflops 105, 106 indicating a negative transition of the input signal.

The data inputs to flipflops 103-106 are from decoder circuit 111, which appropriately divides the VCO clock signal, as depicted in FIGS. 7B and 7C. An output of decoder 111 is input via bus 160 into flipflops 103, 105, which indicate region 8 in FIG. 7B. Similarly, an output on bus 161 from decoder 111 are data inputs to flipflops 104, 106, which indicate region 1 of FIG. 7C.

The Q outputs of flipflops 103-106 are latched into flipflops 115-118, respectively, by the clock signals from VCO circuit 110 on bus 112 corresponding to FIG. 7A.

Flipflop 103 decides if a positive transition has occurred in region 8. Flipflop 104 decides if a positive transition has occurred in region 1. Flipflop 105 decides if a negative transition has occurred in region 8, and flipflop 106 decides if a negative transition has occurred in region 1. If two successive transitions occur, then depending on the number of levels of data transmission, it is possible to have two successive positive transitions in a row or two successive negative transitions. However, the circuit of FIG. 6 which is intended to be illustrative of the present invention and not a limitation responds only to a positive transition followed by a negative transition or a negative transition followed by a positive transition.

The following notation is adopted to distinguish between those events.

1 ↑ = positive transition occurred in region 1
1 ↓ = negative transition occurred in region 1
8 ↑ = positive transition occurred in region 8
8 ↓ = negative transition occurred in region 8

For the frequency detector output to be a reliable measure of the frequency difference between incoming signal and a VCO clock, it is necessary for the FD to look only at two successive data transitions. If A represents the present bit cycle and B represents the next successive bit cycle, then the event that two successive transitions has occurred within regions 1 or 8 can be represented by Two in a row$=(1\uparrow B+8\uparrow B)(8\downarrow A+1\downarrow A)+(8\downarrow B+1\downarrow B)(8\uparrow A+1\uparrow A)$ [3]

The operation of the FD can then be represented as:

speedup$=(1\downarrow A\ 8\uparrow B)+(1\uparrow A\ 8\downarrow B)$ [4]

slow down$=(8\downarrow A\ 1\uparrow B)+(8\uparrow A\ 1\downarrow B)$ [5]

Accordingly, the outputs of flipflops 115-118 are latched into flipflops 121-124, respectively. For two successive data transitions according to equations [B 3]-[5] above, flipflops 115-118 and 121-124 store the following status conditions: 8 ↑ B; 1 ↓ B; 8 ↓ B; 1 ↓ B; 8 ↑ A; 1 ↑ A; 8 ↓ A; 1 ↓ A; in flipflops 115-118 and 121-124, respectively, thereby determining whether successive data transitions of the input data signal occur during the predetermined portions of successive cycles of the clock signal of FIG. 7. The outputs of flipflops 115-118, 121-124 are input to control logic circuits 129, 130 in the following manner.

Logic circuit 129 generates a control signal on bus 170 to indicate that two successive data transitions have occurred in successive bit cycles.

Equation [3] may be implemented by the logic circuitry 129. For example, NOR gate 131 receives the 8 ↑ $\bar{B}$ and 1 ↑ B outputs. Similarly, NOR gate 132 receives the 8 ↓ $\bar{A}$ and 1 ↓ A outputs of flipflops 123, 124. The outputs of NOR gates 131, 132 are in turn input to NOR gate 135.

Similarly, NOR gates 133, 134 receive inputs from flipflops 121, 122 and 117, 118, respectively, which in turn input to NOR gate 136. NOR gate 137 receives the outputs of NOR gates 135, 136 and thereby generates the two successive data transitions signal on bus 170 in accordance with Equation [3].

Logic circuitry 130 (typically 74LS51) is provided to change the frequency of the VCO signal and determines whether the clock signal of the VCO should be increased or decreased. AND gates 140, 141 receive inputs from flipflops 115, 125 and 122, 117 in accordance with Equation [4]. The outputs of AND gates 140, 141 are NORed in NOR gate 144 to form the increase frequency control signal on bus 171 in accordance with Equation [4], since this represents the successive data transitions during the $C_k$ portion of the clock cycle of FIG. 5A followed by the $B_{k+1}$ portion.

Similarly, AND gates 142, 143 receive inputs from flipflops 116, 123 and 121, 118, respectively, which in turn are input to NOR gate 145 to form on bus 172 the decrease frequency control signal in accordance with Equation [5], since this represents the successive data transitions during the $B_k$ portion of the clock cycle of FIG. 5A followed by the $C_{k+1}$ portion.

NOR gate 151 receives the signals on buses 170, 171, which when stored in flipflop 153 an output on bus 24-1 is an indication for the VCO clock to increase its frequency. Similarly, the NOR gate 152 receives buses 170, 172, which when latched flipflop 154 is output on bus 24-2 indicates to the VCO to decrease its frequency.

This completes the description of the frequency detection for the timing recovery circuit 20 of FIG. 2. A description follows for the frequency detection portion of circuit 26 depicted in FIG. 2.

FIG. 8A is a typical signal constellation diagram for a quadrature amplitude modulation (QAM) signal depicting the 16 possible combinations for the I and Q quadrature baseband signals. The constellation of FIG. 8A represents the 16 binary states for the I and Q signals. FIG. 8B depicts a signal constellation for a QPSK signal. The points on these graphs indicate possible values of I(kT) and Q(kT) in Equations [1-2] where $\Delta\omega = \theta = 0$ for these two representative modulation methods.

Although the carrier is suppressed in the transmit modulator, a carrier is required for the receiver at the demodulator and is generated by demodulation signals 2 cos $(\omega_2 t + \theta)$ and 2 sin $(\omega_2 t + \theta)$ in demodulators 28, 29 in FIG. 2. The VCO 14 of FIG. 1 is kept locked in phase by the phase comparator, which is depicted in FIG. 10, by comparing the absolute amplitudes of the I and Q baseband signals, which have in phase axis and quadrature axis components, respectively. For the inner states depicted in FIG. 8A, the amplitudes of the I and Q components will be equal when the phase is correct, but when a phase error occurs one will increase while the other decreases.

FIG. 9 depicts a vector diagram showing the phase relationships of the phase comparator of FIG. 10. In FIG. 9, in the first quadrant, both I and Q values are positive and the phase is correct when I equals Q. When Q is greater than I, it is an indication of a positive phase error (CCW rotation). If Q is less than I, it is an indication of a negative phase error (CW rotation). The relations between I and Q change for each quadrant, as shown in FIG. 9.

FIG. 10 depicts a phase comparator circuit for detecting a change of phase between the quadrature baseband signals I and Q. In FIG. 10, the I and Q signals are input to conventional comparators 30, 31. The +I signal on bus 21-1 and −Q signal on bus 22-1 are connected to comparator 30 and the +Q signal on bus 22-2 and +I signal on bus 21-2 are connected to comparator 31. The outputs of comparators 30, 31 are stored in flipflops 33, 34 respectively, which could be clocked by a timing recovery signal on bus 24 and which could be generated by the circuit of FIG. 6. The "1" output of flipflop 33 will indicate that +I is greater than than −Q, and the "0" output of flipflop 33 indicates that +I is less than −Q. Similarly, the "1" output of flipflop 34 indicates Q is greater than +I and the "0" output indicates Q is less than +I.

Selector 35 (typically LS153) acts as a two-pole, four position switch to generate the positive and negative phase error signals on buses 37, 38. Selector 35 is enabled by logic circuitry (not shown) to select only the four inner states from the signal constellation of FIG. 8A (those states within the dashed line) and excludes the outer 12 states of FIG. 8A, since I does not equal Q for all the outer states.

In FIG. 10, the outputs of selector 35 on buses 37, 38 are passed to low pass filter 40 and amplified by amplifier 41 to obtain a phase error signal on bus 18, which corresponds to bus 18 in FIG. 1. Also, the negative phase error signal on bus 38 is connected to the frequency comparator circuit of FIG. 13.

One limitation of a phase comparator is that erroneous results are obtained when the frequency of the receiver (VCO) is quite different from the frequency of the transmitter carrier. The phase comparator circuit cannot respond fast enough to keep the data from crossing the quadrant boundaries depicted in FIG. 9. When this happens, the quadrant selector 35 of FIG. 10 switches and reverses the control voltage, producing a control voltage with incorrect polarity. The frequency comparator of FIG. 13 is the solution to this problem.

The frequency comparator range according to the present invention is depicted in FIG. 12 for a system capable of receiving quadrature baseband signals. The principle is very similar to that described in timing recovery. The inner states of FIG. 8 will, when there is a frequency error, be rotating in circular trajectories. The FD watches for successive I-Q states which cross the I or Q axis in FIG. 12. The direction of rotation is determined by observing the direction in which the axis is crossed. Operation is restricted to the shaded region of FIG. 12 because when in-lock, the inner states of FIG. 8 would infrequently fall in these regions.

In order to determine the range pattern, the dividing areas for the Q and I signals are depicted in FIG. 11, in which the defining predetermined regions or areas W, X, Y, Z are as follows:

W: 0.417I > Q
X: 0.417I < −Q
Y: 0.417Q > I
Z: 0.417Q < −I

It can be seen in FIG. 11 that there are areas of overlap for regions W and X, Y and Z. The 0.417 value in the particular embodiment shown and described is utilized because the tangent of 22.5° is 0.417.

In FIG. 12, the shaded area is the predetermined region or area in which the frequency comparator of FIG. 13 operates.

In FIG. 13, a schematic diagram of a frequency comparator according to the present invention is depicted. The direction of rotation of a receiver carrier with respect to a local carrier is determined by storing the phase detector outputs as data crosses a quadrant boundary. In the embodiment depicted in FIG. 13, the actual regions utilized are W, $\overline{X}$ (the complement of X), Y and $\overline{Z}$ (the complement of Z).

Timing recovery signals on bus 24 for the frequency comparator of FIG. 13 could be provided by the timing recovery circuit of FIG. 6, the operation of which has been described.

In FIG. 13, the particular ranges W, X, Y, Z are generated by sampling the appropriate I and Q component values in conventional comparators 51–54 respectively, at intervals corresponding to the timing signal. For example, the 0.417I value is input on bus 21-3 along with the +Q value on bus 22-3 and hence comparator 51 will generate the W signal when 0.417I > Q, indicating the "W" operating range. Similarly, comparator 52 generates the "$\overline{X}$" signal representing the "$\overline{X}$" range, comparator 53 generates the "Y" range signal, and comparator 54 generates the "$\overline{Z}$" range signal. The "E" value is defined as the exclusive-OR range (E = W ⊕ $\overline{X}$ ⊕ Y ⊕ $\overline{Z}$) or equivalent to the out of phase lock range.

It can be seen that the exclusive-OR gate 58 will generate the "E" signal, which when stored in flipflop 59 will represent the phase lock loss range signal. When this signal occurs in flipflop 59, it is an indication that the system is operating in a range as depicted in FIG. 12 (the shaded area) which is within a predetermined region of the in-phase axis or quadrature axis as depicted in FIG. 12 and it is necessary for the frequency comparator to generate the frequency error signal on bus 19.

In FIG. 13, the phase error signal on bus 38 (from FIG. 10) is latched into flipflop 74, which when cross latched into flipflop 75 and AND gates 76, 77 will generate the CW signal on bus 78 and CCW signal on bus 79, which are an indication of the direction of rotation of the phase between the I and Q signals. That is, the successive samples of the input baseband signal have crossed either the in-phase axis or the quadrature axis of FIG. 12. Hence, flipflops 74, 75 and AND gates 76, 77 determines, on buses 78, 79, respectively, whether a positive phase error was followed by a negative phase error signal or vice versa, depending upon the direction of crossing the in-phase axis or quadrature axis.

Flipflops 60, 61 and AND gate 62 are used to determine when two phase lock losses occur in a row thereby generating on bus 63 the phase lock loss signal. Flipflops 71, 72 receive an inner state signal on bus 70, which, as previously described, indicates the occurrence of the inner data points of FIG. 8A. The inner state signal on bus 70 can easily be generated by logic circuit (not shown) by one skilled in the art.

The output on buses 63, 74, 78, and 79 are connected to AND gates 81–82, which generate a control signal for changing the frequency of the timing signal, depending upon the direction of rotation of the input baseband signal. A negative frequency error signal from AND gate 81 and a positive frequency error signal from AND gate 82 are generated, depending upon the situation. A high level from AND gate 82 indicates that the frequency of VCO 14 of FIG. 1 should be increased, while a high level from gate 81 indicates that the frequency of VCO 14 should be decreased.

The frequency error signals from AND gates 81, 82 are filtered by low pass filter 83 and amplified by amplifier 84 to form the frequency error signal on bus 19.

Therefore, in the event of occurrence of an operating range as depicted in FIG. 12, the frequency detector will generate the appropriate frequency error signal on bus 19 as shown and described in FIG. 13 in order to compensate for frequency errors beyond the range of the phase detector circuit.

In accordance with the above invention, the improved frequency detector can be constructed of predominantly digital circuitry and requires no filtering functions. Consequently, it is particularly well suited to integrated circuit implementation for both timing recovery and carrier recovery applications in phase lock loop circuits.

What is claimed is:

1. In a frequency detector, a carrier recovery circuit comprising:
   means responsive to an input data signal for generating a timing recovery signal,
   means for generating a local carrier signal having in-phase and quadrature axis components,
   means responsive to said carrier signal and to said input signal for forming a baseband signal having in-phase and quadrature axis components,
   means responsive to said timing recovery signal for sampling said baseband signal having in-phase axis and quadrature axis components at timing intervals corresponding to said timing recovery signal thereby forming a sampled baseband signal,
   means for determining when said sampled baseband signal occurs within a predetermined region of said in-phase axis or said quadrature axis, and
   means for changing the frequency of said carrier signal if successive samples of said sampled signal within said predetermined region are on opposite sides of said in-phase axis or said quadrature axis thereby representing the crossing of said in-phase axis or said quadrature axis.

2. A circuit as in claim 1 wherein said means for determining
   include first logic means for generating a first control signal representing when successive samples of said sampled baseband signal occur within said predetermined region,
   second logic means for generating a second control signal representing said successive transitions, and
   third logic means responsive to said first and second control signals for changing the frequency of said carrier signal.

3. A circuit as in claim 2 wherein said third logic means include means for increasing the frequency of said carrier signal when the in-phase or quadrature axes are crossed in a first direction.

4. A circuit as in claim 2 wherein said third logic means includes means for decreasing the frequency of said carrier signal when the in-phase or quardrature axes are crossed in a second direction.

5. In a carrier recovery circuit for use in a frequncy detector, the method comprising the steps of:
   generating a timing recovery signal,
   generating a local carrier signal having in-phase and quadrature axis components, forming a baseband signal having in-phase and quadrature axis components in response to said recovery signal and said carrier signal, sampling said baseband signal at timing intervals corresponding to said timing recovery signal thereby forming a sampled baseband signal, determining when said sampled baseband signal occurs within a predetermined region of said in-phase axis or said quadrature axis, and changing the frequency of said carrier signal if successive samples of said sampled signal within said predetermined region are on opposite sides of said in-phase axis or said quadrature axis thereby representing the crossing of said in-phase axis or said quadrature axis.

* * * * *